US008699337B2

(12) United States Patent
Shimonishi

(10) Patent No.: US 8,699,337 B2
(45) Date of Patent: Apr. 15, 2014

(54) COMMUNICATION TERMINAL WHICH PERFORM LOW-DELAY COMMUNICATION

(75) Inventor: Hideyuki Shimonishi, Tokyo (JP)

(73) Assignee: NEC Corporation, Tokyo (JP)

( * ) Notice: Subject to any disclaimer, the term of this patent is extended or adjusted under 35 U.S.C. 154(b) by 608 days.

(21) Appl. No.: 12/041,359

(22) Filed: Mar. 3, 2008

(65) Prior Publication Data

US 2008/0219164 A1 Sep. 11, 2008

(30) Foreign Application Priority Data

Mar. 6, 2007 (JP) ................................. 2007-055830

(51) Int. Cl.
*H04J 1/16* (2006.01)
(52) U.S. Cl.
USPC .......................................... 370/232; 370/230
(58) Field of Classification Search
USPC ................. 370/468, 229, 329, 352, 231–240, 370/412–420, 437, 390, 432
See application file for complete search history.

(56) References Cited

U.S. PATENT DOCUMENTS

| 6,560,243 B1* | 5/2003 | Mogul ........................... 370/468 |
| 2004/0064563 A1* | 4/2004 | Kauhanen et al. ............. 709/227 |
| 2004/0215746 A1* | 10/2004 | McCanne et al. ............. 709/219 |
| 2006/0153176 A1* | 7/2006 | Caswell et al. ............... 370/356 |
| 2006/0203855 A1 | 9/2006 | Senta et al. |

FOREIGN PATENT DOCUMENTS

| JP | 2004-090492 | 3/2004 |
| JP | 2005-136548 | 5/2005 |
| JP | 2005136548 A * | 5/2005 | ............... H04L 1/00 |
| JP | 2005-198111 A | 7/2005 |
| JP | 2006-173961 | 6/2006 |
| JP | 2006-254383 A | 9/2006 |
| JP | 2006-279283 | 10/2006 |

OTHER PUBLICATIONS

Shimonishi, Hideyuki et al.; "A Congestion Control Algorithm for Low-Latency Ethernet LAN Communications"; The Institute of Electronics, Information and Communication Engineers Report; NS2006-244, Mar. 1, 2007, vol. 106, No. 577, pp. 453-458.
Takayuki Hama et al.; "Experimental Study of a TCP-Adaptive Reno for High Speed Networks"; The Institute of Electronics, Information and Communication Engineers Report; NS2006-267, Feb. 25, 2005, vol. 104, No. 690, pp. 119-124.
Nandita Dukkipati, et al., "Processor Sharing Flows in the Internet," IFIP International Federation for Information Processing 2005, pp. 267-281.

(Continued)

*Primary Examiner* — Kevin C Harper
*Assistant Examiner* — Samina Choudhry
(74) *Attorney, Agent, or Firm* — Dickstein Shapiro LLP

(57) ABSTRACT

A communication terminal used in a communication system which sets a communication session between a plurality of terminals through a network to perform data transmission and reception includes a first transmission bandwidth control unit which performs transmission bandwidth control independently of a state of the network, a second transmission bandwidth control unit which performs transmission bandwidth control depending on a state of the network, and a bandwidth estimating unit which determines a transmission bandwidth when bandwidth control by the second transmission bandwidth control unit is started. When transmission is started, bandwidth control by the first transmission bandwidth control unit is performed, and when a transmission bandwidth is determined by the bandwidth estimating unit on the basis of a response packet to a transmission packet based on the bandwidth control, the bandwidth control by the second transmission bandwidth control unit is performed.

17 Claims, 9 Drawing Sheets

(56) References Cited

OTHER PUBLICATIONS

Kenshin Yamada, et al., "TCP Westwood with Agile Probing: Dealing witih Dynamic, Large, Leaky Pipes," IEEE Communications Society pp. 1070-1075, 2004 , pp. 1070-1075.

Floyd & Henderson, "The NewReno Modification to TCP's Fast Recovery Algorithm," Network Working Group Request for Comments: 2582, Apr. 1999, pp. 1-11.

* cited by examiner

COMMUNICATION TERMINAL WHICH PERFORM LOW-DELAY COMMUNICATION

BACKGROUND OF THE INVENTION

1. Field of the Invention

The present invention relates to a communication terminal, a communication system, a congestion control method, and a congestion control program, and particular, a communication terminal, a communication system, a congestion control method, and a congestion control program which perform low-delay communication even on a high-speed line.

This application is based upon and claims the benefit of priority from Japanese patent application No. 2007-055830, filed on Mar. 6, 2007, the disclosure of which is incorporated herein in its entirety by reference.

2. Description of the Related Art

In communication through a network, in order to perform a low-delay communication between transmission/reception terminals (terminals which carries out transmission and reception), time taken by causing a transmission bandwidth to reach an optimum bandwidth is required to be shortened as much as possible after the start of transmission. When an amount of transmission data is large, time taken by communication is originally long. For this reason, even though a long time is taken for reaching the optimum transmission bandwidth, the long time has no serious effect. However, when the amount of transmission data is small, if a long time is taken for reaching the optimum transmission bandwidth, communication may be ended until the transmission bandwidth reaches the optimum transmission bandwidth. For this reason, delay of the communication elongates.

When an amount of transmission data is small, if a transmission bandwidth at the start of transmission is smaller than an optimum value, delay time elongates because a network bandwidth cannot be effectively utilized. In contrast to this, when the transmission bandwidth at the start of transmission is larger than the optimum value, delay time elongates because the network is congested.

Since the optimum transmission bandwidth is determined depending on a network state, the optimum transmission bandwidth cannot be fixed immediately after the start of transmission at which the network state is unstable. Therefore, in a congestion control method, the following techniques are used to control the transmission bandwidth to an optimum value.

The first technique is a technique in which a node in a network notifies a transmission terminal of an optimum transmission bandwidth or a technique in which a transmission terminal calculates an optimum transmission bandwidth on the basis of information sent from a node in a network. As an example of the first technique, a method described in "Processor Sharing Flows in the Internet" (Nandita Dukkipati, Masayoshi Kobayashi, Rui Zhang-Shen, Nick McKeown, Thirteenth International Workshop on Quality of Service (IWQoS)) is given. In the method, ideally, an optimum transmission bandwidth can be obtained for time which is almost equal to a round-trip propagation delay time between transmission/reception terminals.

The second technique which transmits a predetermined number of measurement packets or data packets after a start of transmission to estimate an optimum transmission bandwidth and then performs transmission in the estimated transmission bandwidth. For example, in a TCP-Westwood method described in Kenshin Yamada, Ren Wang, and M. Y. Sanadidi and Mario Gerla "TCP westwood with agile probing: Dealing with dynamic, large, leaky pipes", In Processing of IEEE ICC. volume 2. pages 1070-1074. 2004, a method described in Japanese Patent Laying-Open No. 2006-173961 (JP-A-2006-173961), or a method described in JP-A-2004-090492, an optimum communication bandwidth is estimated during TCP communication, and congestion control is performed such that a transmission bandwidth is converged to the communication bandwidth for a short period of time, so that the transmission bandwidth early reaches the optimum bandwidth after the start of transmission. In a method described in JP-A-2006-279283, an optimum communication bandwidth is estimated during TCP communication, and congestion control is performed such that a transmission bandwidth exceeds the communication bandwidth, so that unnecessary congestion is prevented and shortens data transfer delay time. In these methods, after a predetermined number of TCP packets are transmitted after the start of transmission, transmission of the packets is stopped until acknowledgement packets (ACK packets) to these packets arrive. Thereafter, an optimum transmission bandwidth is calculated on the basis of an arrival state of the ACK packets to continue communication.

The third technique is a technique which observes a congestion state of a network while performing transmission and adaptively changes a transmission bandwidth depending on the observation result to converge the transmission bandwidth to the optimum value. For example, in a TCP-NewReno method described in The NewReno Modification to TCP's Fast Recovery Algorithm, RFC2582, Internet Engineering Task Force (IETF), a transmission bandwidth is rapidly increased until a congestion window size reaches a slow start threshold value. Thereafter, the transmission bandwidth is gradually increased until packet discard occurs. In the packet discard, the transmission bandwidth is temporarily cut into half and then increased again as described above, so that congestion is controlled such that the transmission bandwidth varies near the optimum bandwidth.

It is a disadvantage of the first technique that, since pieces of information must be obtained from all the nodes in a network, time corresponding to one round-trip delay time is taken until an optimum transmission bandwidth is obtained after a start of transmission at the minimum. In this technique, since a network node must transmit information related to a transmission bandwidth to a transmission terminal, functions corresponding to all network nodes must be mounted. The technique cannot be easily used in an actual environment.

It is a disadvantage of the second technique that time taken for estimating an optimum transmission bandwidth and, therefore, time taken until the optimum transmission bandwidth is obtained is longer than that in the first technique. In addition, it is another disadvantage that a measurement period is limited because a predetermined number of packets are transmitted immediately after a start of transmission to measure a bandwidth, a measurement period is limited, and an estimated bandwidth is not always an optimum value. In general, when the number of measurement packets is small, a value larger than the optimum value tends to be estimated.

A disadvantage of the third technique is that, a transmission bandwidth is adaptively changed while measuring a state of a network, time taken until an optimum transmission bandwidth is obtained is longer than that in the second technique.

SUMMARY OF THE INVENTION

It is a first exemplary object of the present invention to optimize control of a transmission bandwidth for time until first feedback information is received, i.e., one round-trip transfer time, to reduce a transfer delay of short data.

It is a second exemplary object of the present invention to rapidly calculate an optimum transmission bandwidth by using a limited number of measurement packets without using information from a network node.

According to an exemplary aspect of the present invention, there is provided a communication terminal used in a communication system which sets a communication session between a plurality of terminals through a network to perform data transmission and reception including:

a first transmission bandwidth control unit which performs transmission bandwidth control independently of a state of the network; a second transmission bandwidth control unit which performs transmission bandwidth control depending on a state of the network; and a bandwidth estimating unit which determines the transmission bandwidth when bandwidth control is shifted to bandwidth control by the second transmission bandwidth control unit, and wherein when transmission is started, bandwidth control by the first transmission bandwidth control unit is performed, and when a transmission bandwidth is determined by the bandwidth estimating unit on the basis of reaction information to transmission data based on the bandwidth control, the bandwidth control by the second transmission bandwidth control unit is performed.

According to an exemplary another aspect of the present invention, there is provided a communication terminal used in a communication system which sets a communication session between a plurality of terminals through a network to perform data transmission/reception including:

a first transmission bandwidth control unit which performs transmission bandwidth control independently of a state of the network; a second transmission bandwidth control unit which performs transmission bandwidth control depending on a state of the network; and a bandwidth measuring unit which measures a transmission bandwidth when bandwidth control is shifted to bandwidth control by the second transmission bandwidth control unit, and wherein when transmission is started, bandwidth control by the first transmission bandwidth control unit is performed, on the basis of reaction information to a transmission packet, a suitable bandwidth measuring method is determined to measure a suitable bandwidth, and thereafter, bandwidth control by the second transmission bandwidth control unit is performed.

According to still an exemplary another aspect of the present invention, there is provided a congestion control method for a communication terminal used in a communication system which sets a communication session between a plurality of terminals through a network to perform data transmission and reception, wherein in the communication terminal, transmission bandwidth control is performed independently of a state of the network when transmission is started, a transmission bandwidth is determined on the basis of reaction information to transmission data based on the transmission bandwidth control, and, thereafter, transmission bandwidth control is performed depending on the state of the network.

According to still an exemplary another aspect of the present invention, there is provided a congestion control method for a communication terminal used in a communication system which sets a communication session between a plurality of terminals through a network to perform data transmission and reception, wherein in the communication terminal, transmission bandwidth control is performed independently of a state of the network when transmission is started, suitable bandwidth measuring method is determined to perform a suitable bandwidth on the basis of reaction information to transmission data based on the transmission bandwidth control, and, thereafter, transmission bandwidth control is performed depending on the state of the network.

According to still an exemplary another aspect of the present invention, there is provided a congestion control program to cause a computer serving as a communication terminal of a communication system which sets a communication session between a plurality of communication terminals through a network to perform data transmission and reception to perform transmission bandwidth control independently of a state of the network when transmission is started, to determine a transmission bandwidth on the basis of reaction information to transmission data based on the transmission bandwidth control, and thereafter, to execute a process of performing transmission bandwidth control on the basis of the state of the network.

According to still an exemplary another aspect of the present invention, there is provided a congestion control program to cause a computer serving as a communication terminal of a communication system which sets a communication session between a plurality of communication terminals through a network to perform data transmission and reception to perform transmission bandwidth control independently of a state of the network when transmission is started, to determine a suitable bandwidth measuring method to measure a suitable bandwidth on the basis of reaction information to transmission data based on the transmission bandwidth control, and thereafter, to execute a process of performing transmission bandwidth control depending on the state of the network.

According to the present invention, the following effects are achieved.

First, even in time from a start of transmission to reception of the first feedback information, i.e., within one round-trip transfer time after the start of transmission, a transmission bandwidth is controlled by an initial transmission bandwidth control unit to make it possible to reduce a transfer delay of short data.

Secondly, a suitable transmission bandwidth can be rapidly calculated by using a limited number of measurement packets without using information from a network node.

DESCRIPTION OF THE PREFERRED EMBODIMENTS

Figure 1:
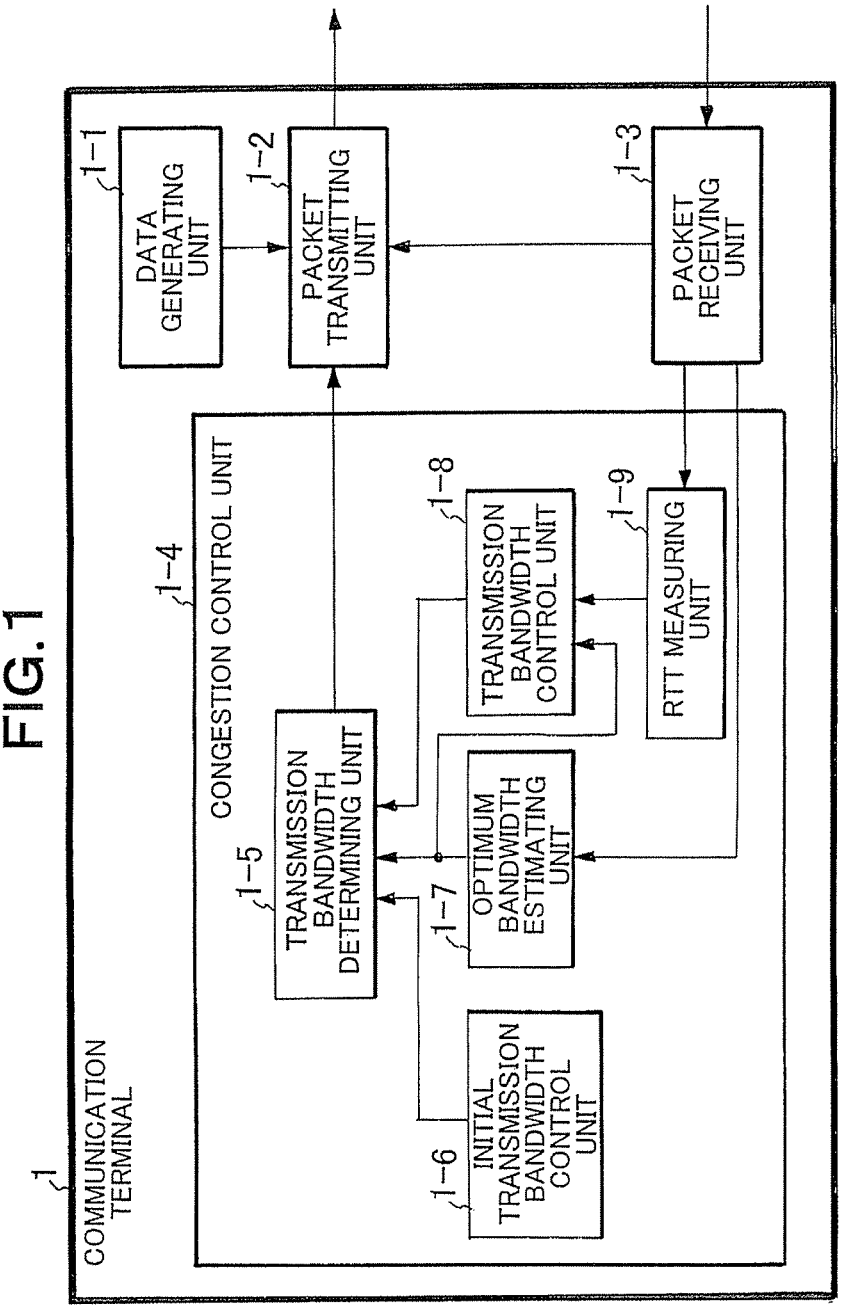
FIG. 1 is a block diagram showing a configuration of a terminal according to a first exemplary embodiment of the present invention.

Details of exemplary embodiments of the present invention will be described below by using the accompanying drawings.

A first exemplary embodiment of the present invention is a communication terminal used in a communication system which sets a communication session between a plurality of terminals through a network to perform data transmission and reception including:

a first transmission bandwidth control unit which performs transmission bandwidth control independently of a state of the network; a second transmission bandwidth control unit which performs transmission bandwidth control depending on a state of the network; and a bandwidth estimating unit which determines the transmission bandwidth when bandwidth control is shifted to bandwidth control by the second transmission bandwidth control unit, and wherein when transmission is started, bandwidth control by the first transmission bandwidth control unit is performed, and when a transmission bandwidth is determined by the bandwidth estimating unit on the basis of reaction information to transmission data based on the bandwidth control, the bandwidth control by the second transmission bandwidth control unit is performed.

As the reaction information, for example, an arrival state of an acknowledgement to transmission data controlled and transmitted by the first transmission bandwidth control unit, round-trip delay time or one-way delay time related to the transmitted data, transmission bandwidth information communicated from the network, or a congestion state in the network is used.

Shift from the bandwidth control by the first transmission bandwidth control unit to the bandwidth control by the second transmission bandwidth control unit is performed by, for example, arrival of an acknowledgement packet to the transmitted data controlled and transmitted by the first transmission bandwidth control unit, by an elapse of a predetermined period of time after the start of transmission, by transmission of a predetermined amount of data after the start of transmission, by detection of packet discard, or by arrival of congestion information from the network.

The transmission bandwidth is determined as follows. For example, a transmission bandwidth is determined on the basis of an arrival speed of an acknowledgement to a predetermined amount of initially transferred data or initially transferred data for a predetermined period of time, the transmission bandwidth is adjusted on the basis of round-trip delay time related to data transmitted thereafter, and the adjusted transmission bandwidth is determined as a first transmission bandwidth used when bandwidth control is shifted to bandwidth control by the second transmission bandwidth control.

The first transmission bandwidth control unit designates a first transmission bandwidth predetermined at the start of transmission, and, therefore, after a predetermined amount of data is output or a predetermined period of time has elapsed, the first transmission bandwidth control unit designates a predetermined second transmission bandwidth. After data transmission is temporarily stopped, when the data transmission is restarted, the first bandwidth can be set by using transmission bandwidths or the like at stop time of the data transmission and before the stop of the data transmission. In this case, when the transmission stop time is short, the first bandwidth can be set on the basis of the transmission bandwidth before the stop of the data transmission, and when the transmission stop time is long, the first bandwidth can be set on the basis of a line speed. The first transmission bandwidth control unit designates a predetermined first bandwidth at the start of transmission, and, thereafter, each time a predetermined amount of data is output or each time a predetermined period of time has elapsed, the transmission bandwidth can be gradually reduced. After data transmission is temporarily stopped, when the data transmission is restarted, a reduction in transmission bandwidth can be set by using the transmission bandwidths or the like at stop period of time of the data transmission and before stop of the data transmission.

The first bandwidth, for example, is determined by a line speed of a line to which a transmission terminal is connected, the maximum transmission bandwidth in the past communication, an internal bus bandwidth of the transmission terminal, or the maximum communication speed assumed by a communication application. The second bandwidth, for example, is determined by a bandwidth obtained by dividing a link bandwidth by the assumed communication session, a minimum transmission bandwidth in the past communication, or the minimum communication speed assumed by the communication application.

In the present embodiment, after data transmission is temporarily stopped, at a restart of the data transmission, when a stop period of time is shorter than a predetermined period of time, the bandwidth control by the second transmission bandwidth control unit is continued, and when a stop period of time is longer than a predetermined period of time, the control is performed to return the bandwidth control by the first transmission bandwidth.

A second exemplary embodiment of the present invention is a communication terminal used in a communication system which sets a communication session between a plurality of terminals through a network to perform data transmission and reception including:

a first transmission bandwidth control unit which performs transmission bandwidth control independently of a state of the network; a second transmission bandwidth control unit which performs transmission bandwidth control depending on a state of the network; and a bandwidth measuring unit which measures the transmission bandwidth when bandwidth control is sifted to bandwidth control by the second transmission bandwidth control unit, and wherein when transmission is started, bandwidth control by the first transmission bandwidth control unit is performed, and on the basis of reaction information to a transmission packet based on the bandwidth control, a method for measuring a suitable bandwidth is determined to measure the suitable bandwidth, and thereafter, bandwidth control by the second transmission bandwidth control unit is performed.

As the reaction information, an arrival state of an acknowledgement to data controlled and transmitted by the first transmission bandwidth control unit, round-trip delay time or one-way delay time related to the transmitted data, transmission bandwidth information communicated from the network, or a congestion state in the network is used. On the basis of the reaction information, a bandwidth measuring method is determined, and measurement of the bandwidth is started by arrival state of an acknowledgement packet to the data controlled and transmitted by the first initial transmission bandwidth control unit, an elapse of a predetermined period of time after the start of transmission, transmission of a predetermined amount of data after the start of transmission, detection of packet discard, or arrival of congestion information from the network. When the bandwidth is determined, by using the determined bandwidth as an initial value of a transmission bandwidth, the bandwidth control can be shifted to the bandwidth control by the second transmission bandwidth control unit.

A transmission bandwidth of the measurement packet is determined from an arriving speed of an acknowledgement to a predetermined amount of initially transferred data or initially transferred data for a predetermined period of time to transmit a measurement packet, and the first transmission bandwidth in shift to the bandwidth control by the second transmission bandwidth control unit is determined from the arrival speed of the acknowledgement to the measurement packet.

A third exemplary embodiment of the present invention is a communication system having the communication terminal according to the first or second exemplary embodiment and another communication terminal which transmits or receives data to/from the communication terminal.

The configurations of the first and second exemplary embodiments described above can also be realized as a congestion control method and a congestion control program in a communication terminal.

Concrete exemplary embodiments of the present invention will be described below. An "optimum bandwidth" includes not only a range close to the optimum bandwidth and the optimum bandwidth but also a preferable bandwidth.

First Exemplary Embodiment

A first exemplary embodiment of the present invention will be described below with reference to the accompanying drawings.

(Explanation of Configuration)

FIG. 1 is a block diagram showing a configuration of a communication terminal 1 according to the embodiment. The communication terminal 1 is constituted by a data generating unit 1-1 which generates transmission data, a packet transmitting unit 1-2 which outputs communication data to a network, a packet receiving unit 1-3 which receives an acknowledge packet (ACK packet) from a communication terminal of communicatee, and a congestion control unit 1-4 which designates a transmission bandwidth for the packet transmitting unit 1-2.

The congestion control unit 1-4 is constituted by an initial transmission bandwidth control unit 1-6 serving as a first transmission bandwidth control unit which performs bandwidth control at the beginning of the start of transmission, an optimum bandwidth estimating unit 1-7 which estimates a state of a network to determine an optimum transmission bandwidth, a transmission bandwidth control unit 1-8 serving as a second transmission bandwidth control unit which controls a transmission bandwidth in a stationary state, a transmission bandwidth determining unit 1-5 which determines the transmission bandwidth designated to the packet transmitting unit 1-2 on the basis of the transmission bandwidth designated by the initial transmission bandwidth control unit 1-6, the optimum bandwidth estimated by the optimum bandwidth estimating unit 1-7, and the transmission bandwidth designated by the transmission bandwidth control unit 1-8, and an RTT measuring unit 1-9 which measures round-trip delay time each time an ACK packet is received.

(Explanation of Operation)

Figure 2:
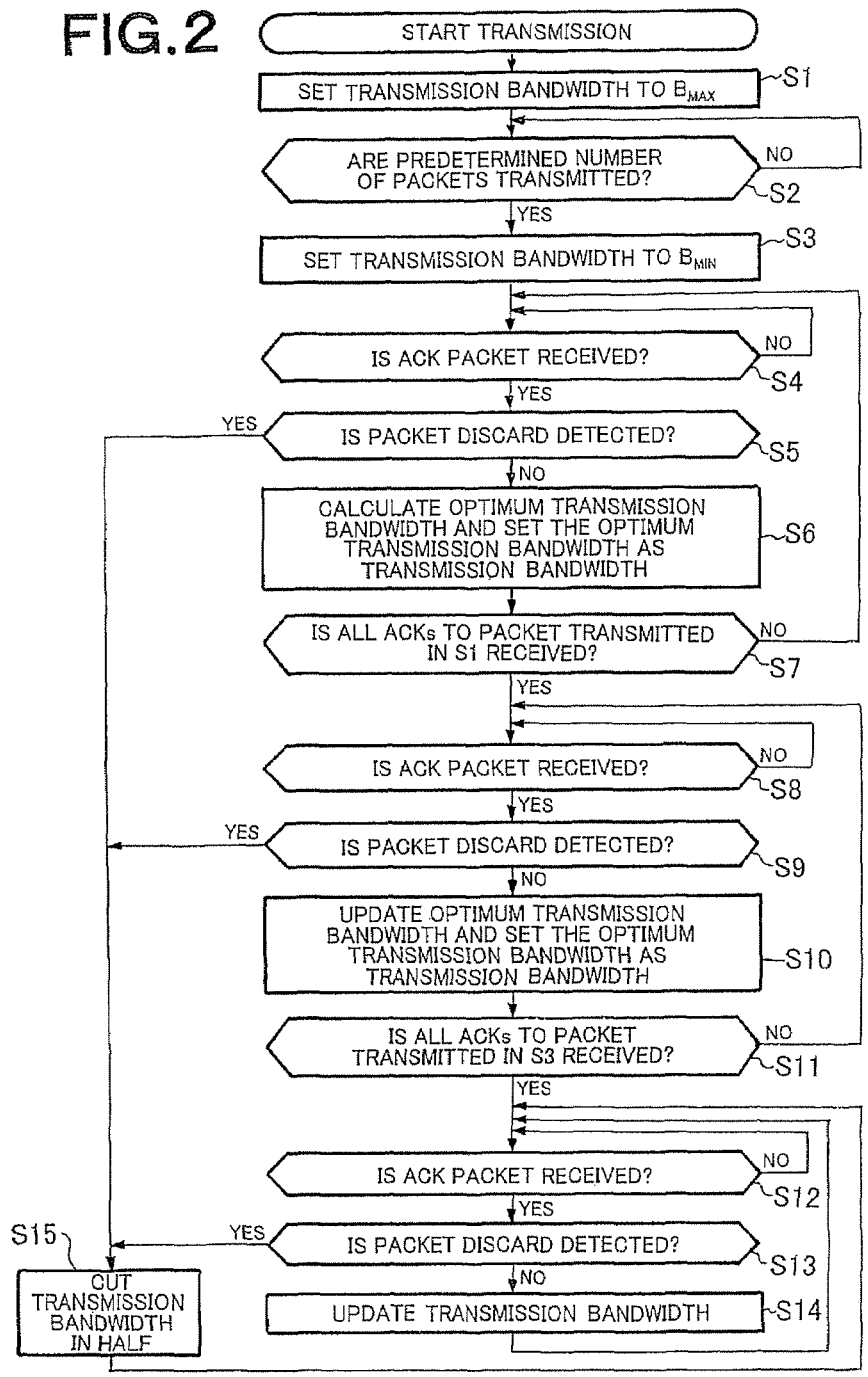
FIG. 2 is a flow chart showing an operation of the first exemplary embodiment of the present invention.

FIG. 2 is a flow chart for explaining an operation of the embodiment. An operation of the embodiment will be described below with reference to FIGS. 1 and 2.

When transmission data is generated in the data generating unit 1-1, the packet transmitting unit 1-2 packets the transmission data and transmits the packet according to a transmission bandwidth designated by the congestion control unit 1-4. When an ACK packet to the transmitted packet arrives from the communication terminal of the communicatee, the packet receiving unit 1-3 notifies the packet transmitting unit 1-2, the optimum bandwidth estimating unit 1-7, and the RTT measuring unit 1-9 of the arrival. In the RTT measuring unit 1-9, measures round-trip delay time (RTT) related to the packet and a minimum value (RTTmin) of the round-trip delay time from the start of transmission. In this case, RTT means time taken until one packet goes from a source to a destination and returns to the source in the network communication. In the embodiment, the round-trip delay time (RTT) is used as a delay. However, one-way delay time may be alternatively used. As a method of deriving the one-way delay time, the following method may be used. For example, a transmission terminal on a transmission side writes transmission time in a packet header in a packet transmission state, and a transmission terminal on a reception side which receives the packet calculates a difference between the transmission time and the packet reception time as a one-way delay, writes the calculated value in an ACK packet to notify the communication terminal on the transmission side of the calculated value.

In the congestion control unit 1-4, at the start of transmission, the initial transmission bandwidth control unit 1-6 controls a transmission by the following method.

Immediately after the start of transmission, the initial transmission bandwidth control unit 1-6 sets a transmission bandwidth to $B_{MAX}$ (step S1). A typical value of $B_{MAX}$ is a line speed of a line to which a transmission terminal is connected. When a predetermined number of packets are completely output (step S2), the initial transmission bandwidth control unit 1-6 sets a transmission bandwidth to $B_{MIN}$ (step S3). Even though a network is being congested, $B_{MIN}$ is set to be a small value which is enough not to cause a problem.

When arrival of an ACK packet is started, in the optimum bandwidth estimating unit 1-7, the following optimum transmission bandwidth is calculated. Until all ACK packets to the packets transmitted during step S1 of setting the transmission bandwidth to $B_{MAX}$ come back, each time an ACK packet is received (step S4), the transmission bandwidth is calculated according to the following equation (1) (step S6). At this time, if a packet loss is detected (step S5), the transmission bandwidth is reduced by a predetermined rate (step S15), and the control of the stationary state (subsequent to step S12) is restarted.

$$\text{Transmission bandwidth} = (\text{amount of transmission data which can be confirmed to be received by ACK packet})/((\text{time at which final ACK packet is received}) - (\text{time at which first ACK packet is received})) \quad \text{Equation (1)}$$

Until all ACK packets to packets transmitted during step S3 of setting the transmission bandwidth as $B_{MIN}$, each time an ACK packet is received (step S8), the transmission bandwidth is calculated according to the following equation (2) (step S10). At this time, if a packet loss is detected (step S9), a transmission bandwidth is reduced by a predetermined rate (step S15), and the control of the stationary state (subsequent to step S12) is restarted.

$$\text{Transmission bandwidth} = (\text{transmission bandwidth finally calculated by equation (1)}) \times ((\text{maximum RTT measured in step } S4) + (\text{maximum RTT measured in step } S7) - \text{RTTmin})/\text{RTTmin} \quad \text{Equation (2)}$$

Subsequently, in the transmission bandwidth control unit 1-8, a transmission bandwidth is controlled as follows. Each time an ACK packet is received (step S12), according to the following equation (3), the transmission bandwidth is appropriately updated (step S14). If a packet loss is detected, the transmission bandwidth is reduced by a predetermined rate (step S15).

Transmission bandwidth=(previously calculated transmission bandwidth)+(α/RTT−(RTT−RTTmin)/RTT×(previously calculated transmission bandwidth))×time constant    Equation (3)

As the time constant, for example, a value obtained by (time for current calculation−time for previous calculation)× RTT or the like is used. Even though the following equation is used in place of Equation (3), the same result as described above can be obtained.

Transmission bandwidth=(reception bandwidth at reception terminal calculated from ACK)+α/RTT×time constant    Equation (3')

When the value α is set at a fixed value, Equation (3) corresponds to a congestion control method similar to the TCP-FAST method.

In the embodiment, in place of Equation (3), a controlling equation obtained by a conventionally proposed arbitrary congestion control method may be used.

When communication is restarted after the communication is stopped for a predetermined period of time, the stop period of time is short, the control is restarted from control of a stationary state (subsequent to step S12). However, the stop period of time is longer than a predetermined period of time, control is performed again from the beginning (step S1).

In this embodiment, in order to increase a transmission bandwidth up to an optimum value immediately after an optimum bandwidth is measured at the start of transmission, communication can be performed at a speed higher than that in a method which gradually increases the transmission bandwidth while checking the state of the network.

In order to measure an optimum transmission bandwidth, data must be output in a large bandwidth $B_{MAX}$ immediately after the start of transmission. In this embodiment, the transmission bandwidth is decreased to the minimum value $B_{MIN}$ immediately after a number of packets required for measurement are completely transmitted. For this reason, even though a large number of flows simultaneously start communication, a network is slightly congested.

In the embodiment, after transmission of a packet required for measurement is ended, the transmission is not stopped, and the packet is transmitted in the low bandwidth $B_{MIN}$ to continue observation of a network. Therefore, when the transmission is stopped immediately after transmission of a packet required for measurement is ended, a state of the network cannot be immediately obtained because ACK packet does not come back for a while after control in a stationary state is started. However, in the embodiment, even immediately after the control in the stationary state is started, the state of the network measured in the bandwidth $B_{MIN}$ can be immediately obtained, and congestion control can be more stably performed.

Second Exemplary Embodiment

A second exemplary embodiment of the present invention will be described below with reference to the accompanying drawings. This embodiment has the same configuration as that in the first embodiment except for an operation of an initial transmission bandwidth control unit. Different points between the operations of the initial transmission bandwidth control units will be described below with reference to FIG. 3.

(Explanation of Operation)

Figure 3:
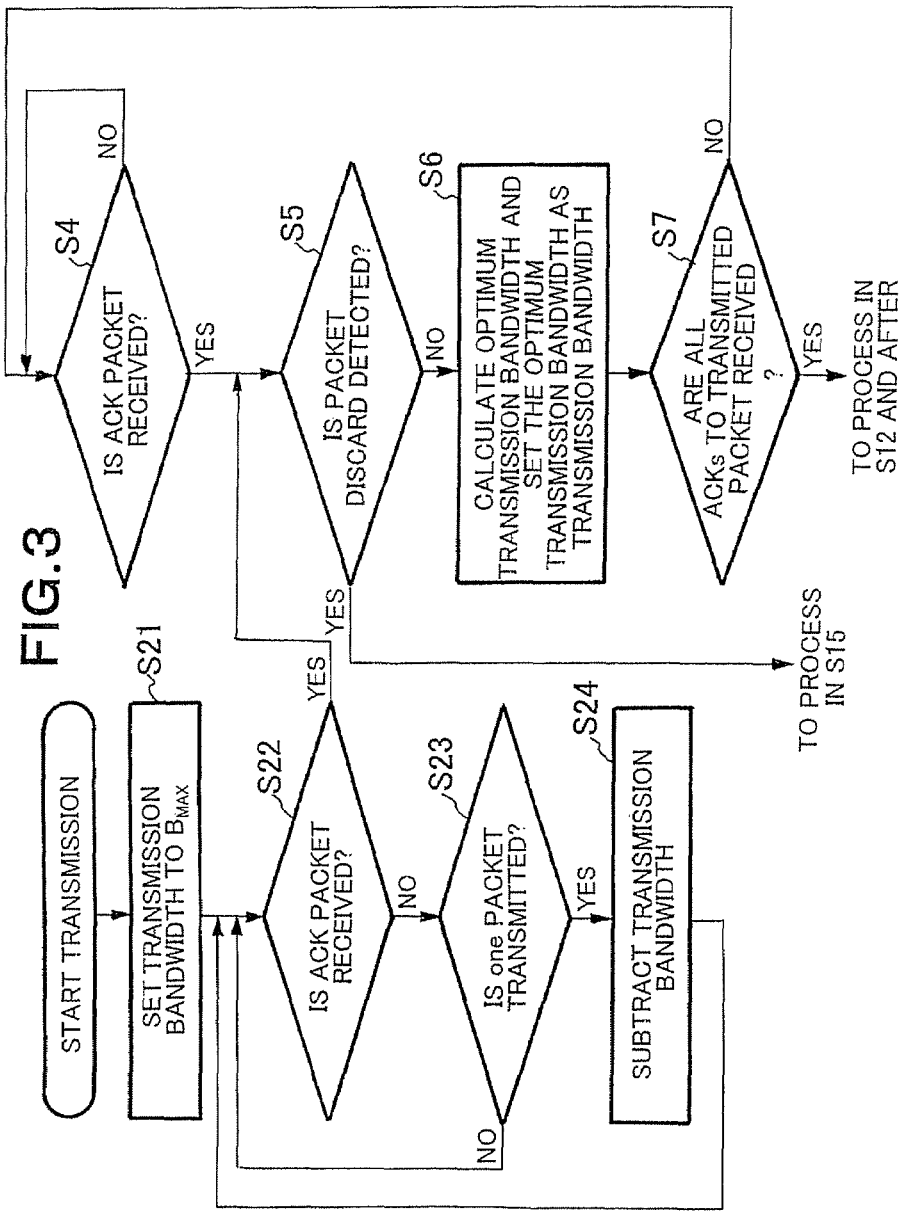
FIG. 3 is a flow chart showing an operation of a second exemplary embodiment of the present invention.

FIG. 3 is a flow chart for explaining an operation of the embodiment.

Even in the embodiment in the initial transmission bandwidth control unit, immediately after a start of transmission, a transmission bandwidth is set to $B_{MAX}$ (step S21). Thereafter, until an ACK packet is received (step S22), each time one packet is output (step S23), the transmission bandwidth is reduced (step S24). According to the following Equation (5), the transmission bandwidth is updated.

Transmission bandwidth=(previously calculated transmission bandwidth)×constant    Equation (5)

In this equation, the constant may be a certain fixed value, a variable value depending on an updating interval of the transmission bandwidth. When the first ACK packet is received, step S5 in the first embodiment is started. Thereafter, processes in step S4 to step S7 are performed. When all ACK packets to the transmitted packets are received, the control operation shifts to the processes in step S12 or later. When a packet loss (packet discard) is detected, the control operation shifts to step S15.

An effect of the embodiment is the same as the effect of the first embodiment. In the first embodiment, in bandwidth measurement, since a transmission bandwidth is continuously changed, the number of transmission packets need not be managed in the bandwidth measurement, the device can be more easily mounted.

Third Exemplary Embodiment

A third exemplary embodiment of the present invention will be described below with reference to the accompanying drawings.

(Explanation of Configuration)

Figure 4:
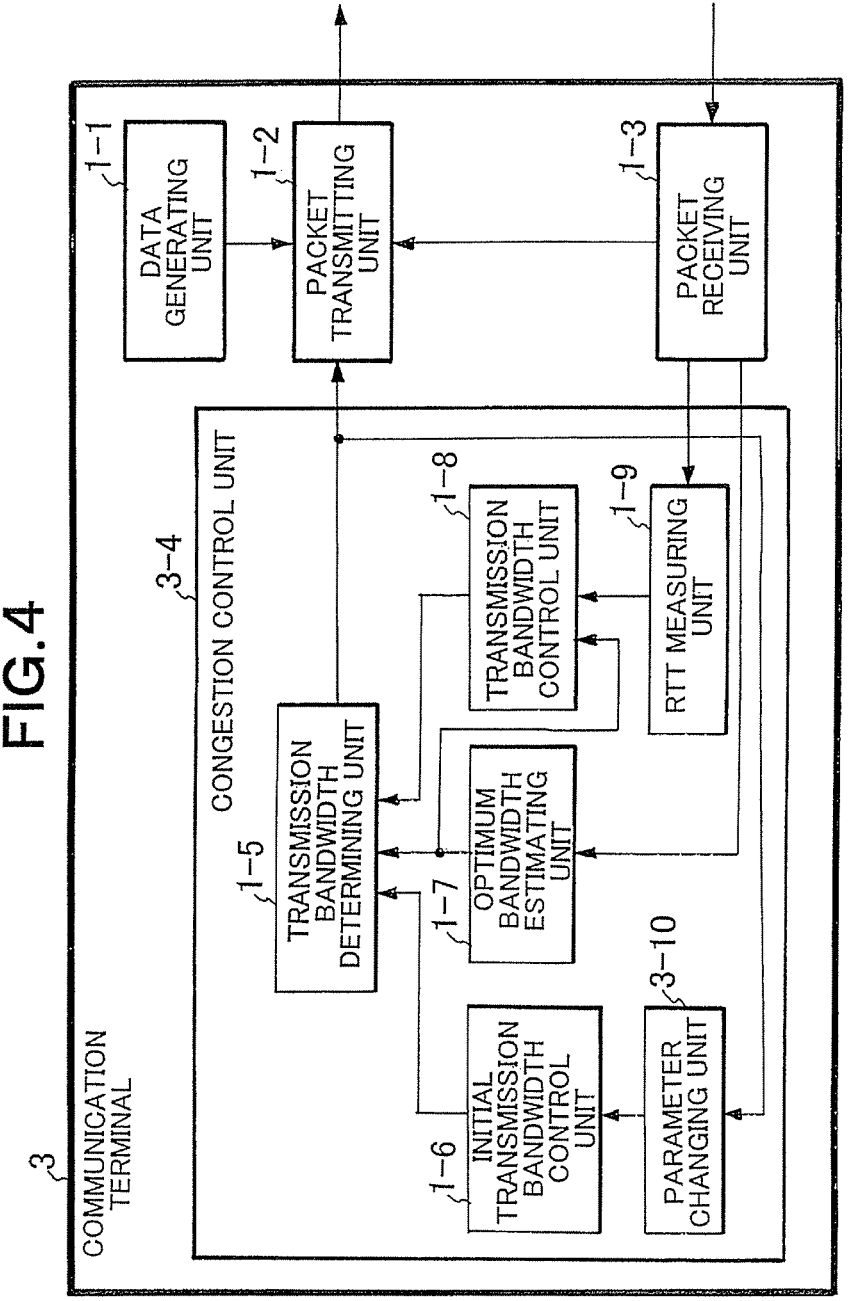
FIG. 4 is a block diagram showing a configuration of a terminal according to a third exemplary embodiment of the present invention.

FIG. 4 is a block diagram showing a configuration of a terminal 3. In comparison with the configuration of the first embodiment, the configuration of the terminal 3 is obtained such that a parameter changing unit 3-10 which dynamically changes a parameter of an initial transmission bandwidth control unit 1-6 is added to a congestion control unit 3-4. Since the other configuration is the same as that in the congestion control unit 1-4, the same reference symbols as in the congestion control unit 1-4 denote the same parts in the congestion control unit 3-4, and a description thereof will be omitted.

(Explanation of Operation)

In an operation of the embodiment, operations performed from a start of transmission during the transmission are the same as those in the first embodiment. Upon completion of the transmission or after the stop of the transmission, when the transmission is restarted, the parameter changing unit 3-10 dynamically changes an operation parameter of the initial transmission bandwidth control unit 1-6 as will be described below according to a length of stop period of time and a transmission bandwidth obtained before the stop.

A transmission bandwidth $B_{MAX}$ at the start of transmission is changed as expressed by the following Equation (6).

$B_{MAX}$=(1−1/exp(stop time))×(line speed)+1/exp(stop time)×(transmission bandwidth obtained before stop)    Equation (6)

Alternatively, the transmission bandwidth $B_{MAX}$ is not changed, and the number of transmission packets in (step S2) is changed as expressed by the following Equation (7).

$$\begin{aligned} \text{The number of transmission packets} = \quad & \text{Equation (7)}\\ (1-1/\exp(\text{stop time})) \times (\text{initial value of}\\ \text{the number of transmission packets}) + \\ 1/\exp(\text{stop time}) \times (\text{initial value of the}\\ \text{number of transmission packets}) \times \\ (\text{transmission bandwidth obtained before stop})/\\ (\text{capacity of line}) \end{aligned}$$

When the transmission is stopped while being performed in the transmission bandwidth $B_{MAX}$ and when the transmission is stopped when the transmission bandwidth is uncalculated, the transmission bandwidth is calculated after an ACK to the transmitted packet arrives to prepare for a restart of the transmission.

In the above example, the calculation of Equation (6) or Equation (7) is performed on the basis of a transmission bandwidth in the previous transmission. However, the calculation may be performed on a transmission bandwidth in a plurality of transmissions subsequent to the previous transmission.

In the embodiment, in comparison with the first embodiment, the number of packets to measure an optimum bandwidth at a start of transmission can be reduced. If the next communication performed immediately after the previous communication is ended, it is supposed that a change in state of a network during this time is small. For this reason, the transmission bandwidth $B_{MAX}$ of the next communication can be reduced on the basis of bandwidth information obtained in the previous communication. When the elapse of time after the previous communication is ended, it is supposed that a change in state of the network during this time is large. For this reason, the value $B_{MAX}$ may be returned to be a large value according to the elapse of time.

Fourth Exemplary Embodiment

A fourth exemplary embodiment of the present invention will be described below with reference to the accompanying drawings.

(Explanation of Configuration)

Figure 5:
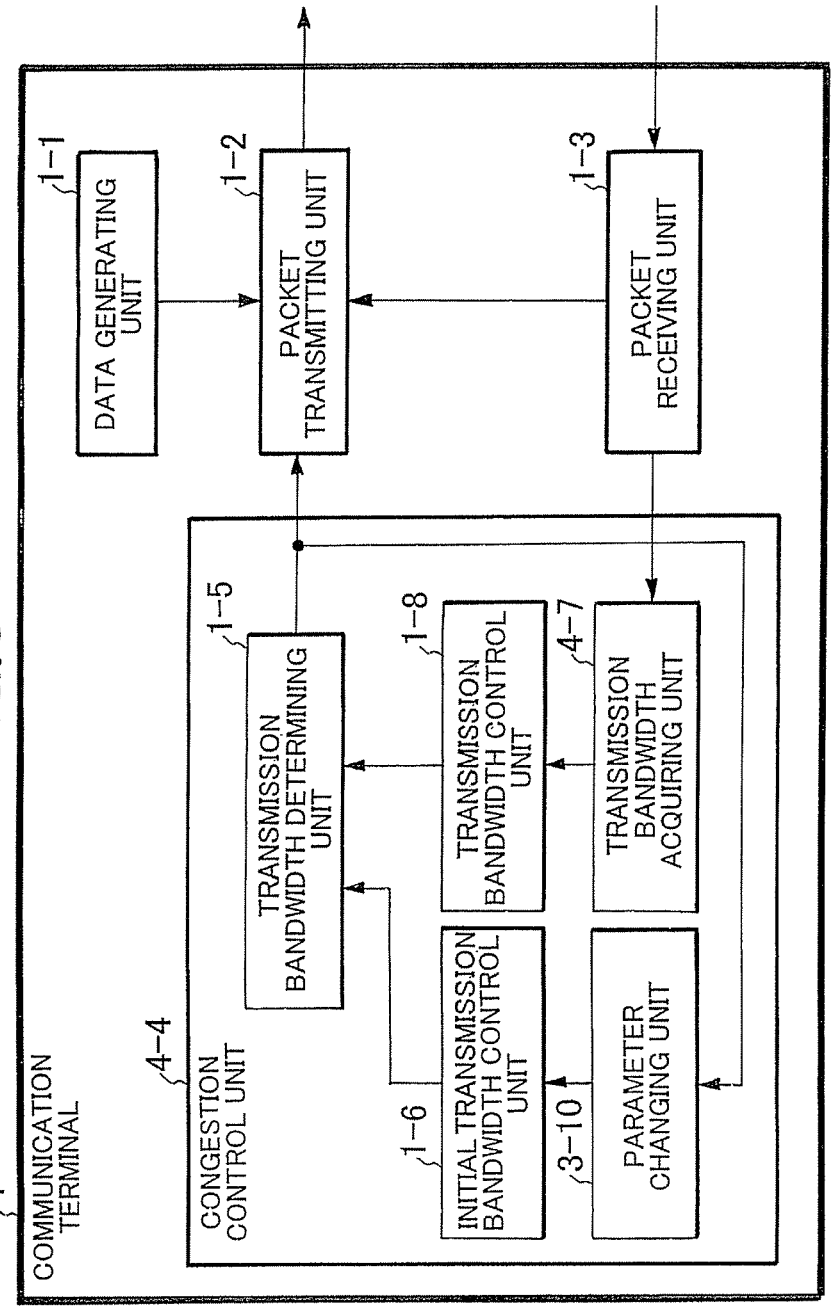
FIG. 5 is a block diagram showing a configuration of a terminal according to a fourth exemplary embodiment of the present invention.

FIG. 5 is a block diagram showing a configuration of a communication terminal 4 according to the embodiment. This embodiment is different from the first embodiment in that no RTT measuring unit and no optimum bandwidth estimating unit are arranged in a congestion control unit 4-4 of the communication terminal 4 and a transmission bandwidth acquiring unit 4-7 which acquires a transmission bandwidth designated from a network is arranged. On the basis of the transmission bandwidth acquired by the transmission bandwidth acquiring unit 4-7, a transmission bandwidth is controlled in the transmission bandwidth control unit 1-8. As in the third embodiment, a parameter changing unit 4-10 which dynamically changes parameters for the initial transmission bandwidth control unit 1-6 is arranged.

(Explanation of Operation)

Figure 6:
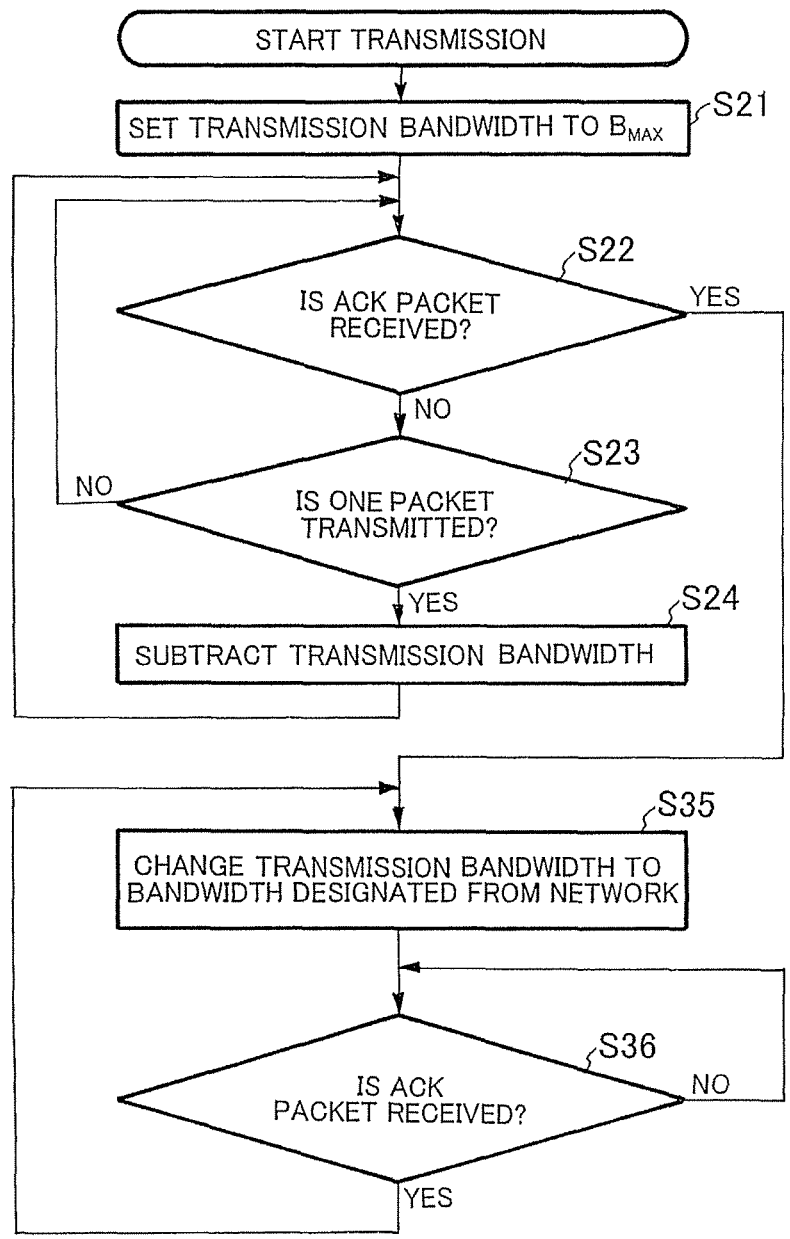
FIG. 6 is a flow chart showing an operation of the fourth exemplary embodiment of the present invention.

FIG. 6 is a flow chart for explaining an operation of the embodiment. In this case, with reference to FIGS. 5 and 6, the operation of the embodiment will be described below.

When transmission data is generated in the data generating unit 1-1, according to the transmission bandwidth designated by the congestion control unit 4-4, a packet transmitting unit 4-2 packets the transmission data and transmits the packet. When an ACK packet to the transmitted packet arrives from the communication terminal of a communicatee, the packet receiving unit 1-3 notifies the packet transmitting unit 1-2 and the transmission bandwidth acquiring unit 4-7 of the arrival.

In the congestion control unit 4-4, as in the flow chart in FIG. 3, at a start of transmission, the initial transmission bandwidth control unit 1-6 controls a transmission bandwidth as will be described below. Immediately after the start of transmission, the transmission bandwidth is set to $B_{MAX}$ (step S21). Thereafter, until an ACK packet is received (step S22), each time one packet is output (step S23), the transmission bandwidth is reduced (step S24), by using the following Equation (5).

When the arrival of the ACK packet is started, a transmission bandwidth designated by the ACK packet from a network is set as a transmission bandwidth at the beginning of the shift, and the bandwidth control is shifted to the bandwidth control by the transmission bandwidth control unit 1-8. Subsequently, each time the ACK packet is received (step S36), according to a bandwidth designated from the network, the transmission bandwidth is changed (step S35). When the transmission is temporarily stopped and, thereafter, restarted, the transmission bandwidth $B_{MAX}$ is changed according to the Equation (6).

In the embodiment, since a state of the network can be explicitly obtained by an ACK packet, congestion control can be correctly more than that in the first embodiment.

In comparison with a method which can explicitly obtain a state of the network by an ACK packet, in the method, transmission in a large bandwidth cannot be performed until a first network state is obtained, and transmission time for specially short data elongates. On the other hand, in the method (configuration) of the embodiment, even though the state of the network cannot be obtained, bandwidth control is positively performed by a bandwidth obtained at the end of the previous communication, elapsed time from the end, or elapsed time from a start of communication at this time. For this reason, in particular, communication time of the specially short data can be shortened.

Fifth Exemplary Embodiment

A fifth exemplary embodiment of the present invention will be described below with reference to the accompanying drawings.

(Explanation of Configuration)

Figure 7:
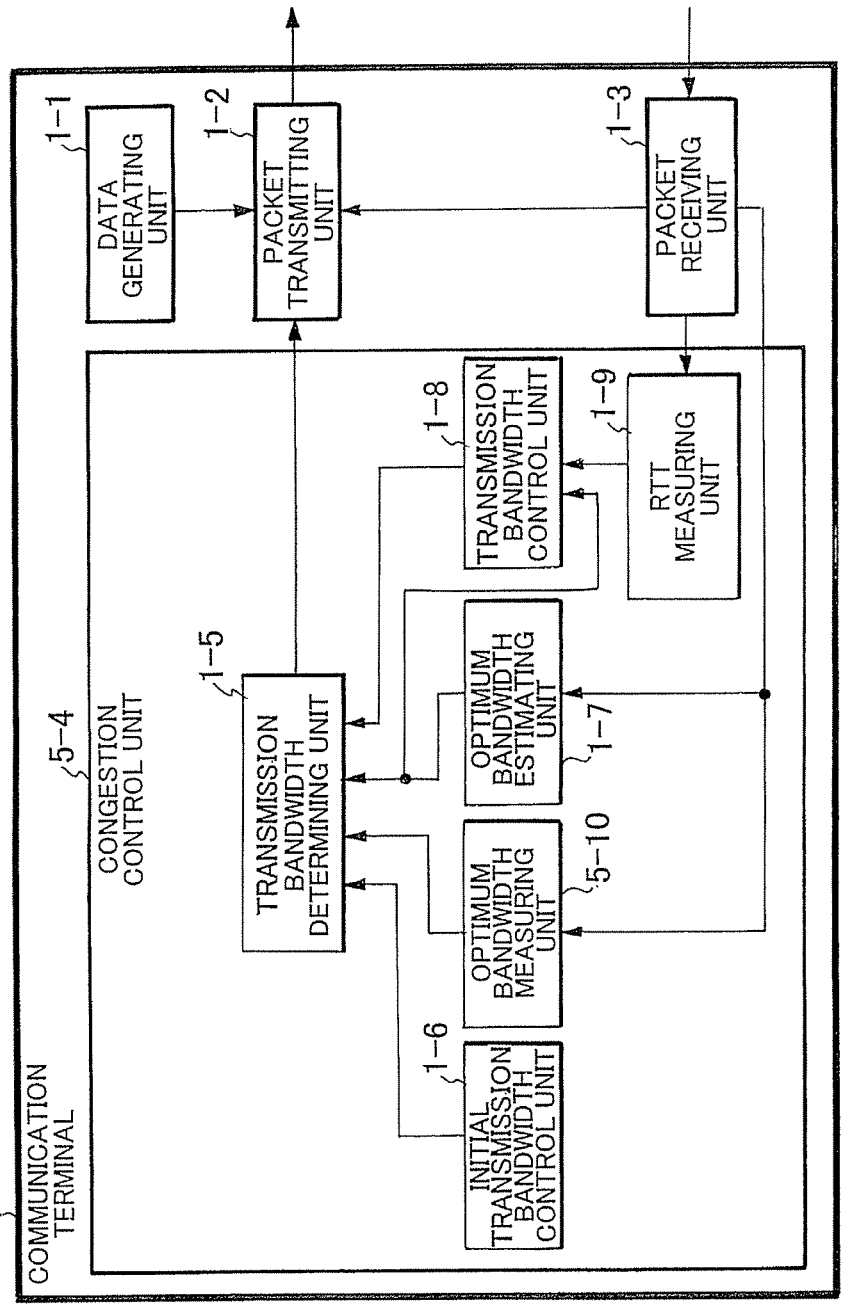
FIG. 7 is a block diagram showing a configuration of a terminal according to a fifth exemplary embodiment of the present invention.

FIG. 7 is a block diagram showing a configuration of a communication terminal 5 according to the embodiment. The embodiment is different from the first embodiment in that a congestion control unit 5-4 of the communication terminal 5 has an optimum bandwidth measuring unit 5-10 which outputs a measurement packet to estimate a network state. A transmission bandwidth determining unit 1-5 determines a transmission bandwidth designated for the packet transmitting unit 1-2 on the basis of a transmission bandwidth designated by an initial transmission bandwidth control unit 1-6, a transmission bandwidth of a measurement packet designated by the optimum bandwidth measuring unit 5-10, an optimum bandwidth estimated by the optimum bandwidth estimating unit 1-7, and a transmission bandwidth designated by the transmission bandwidth control unit 1-8.

(Explanation of Operation)

Figure 8:
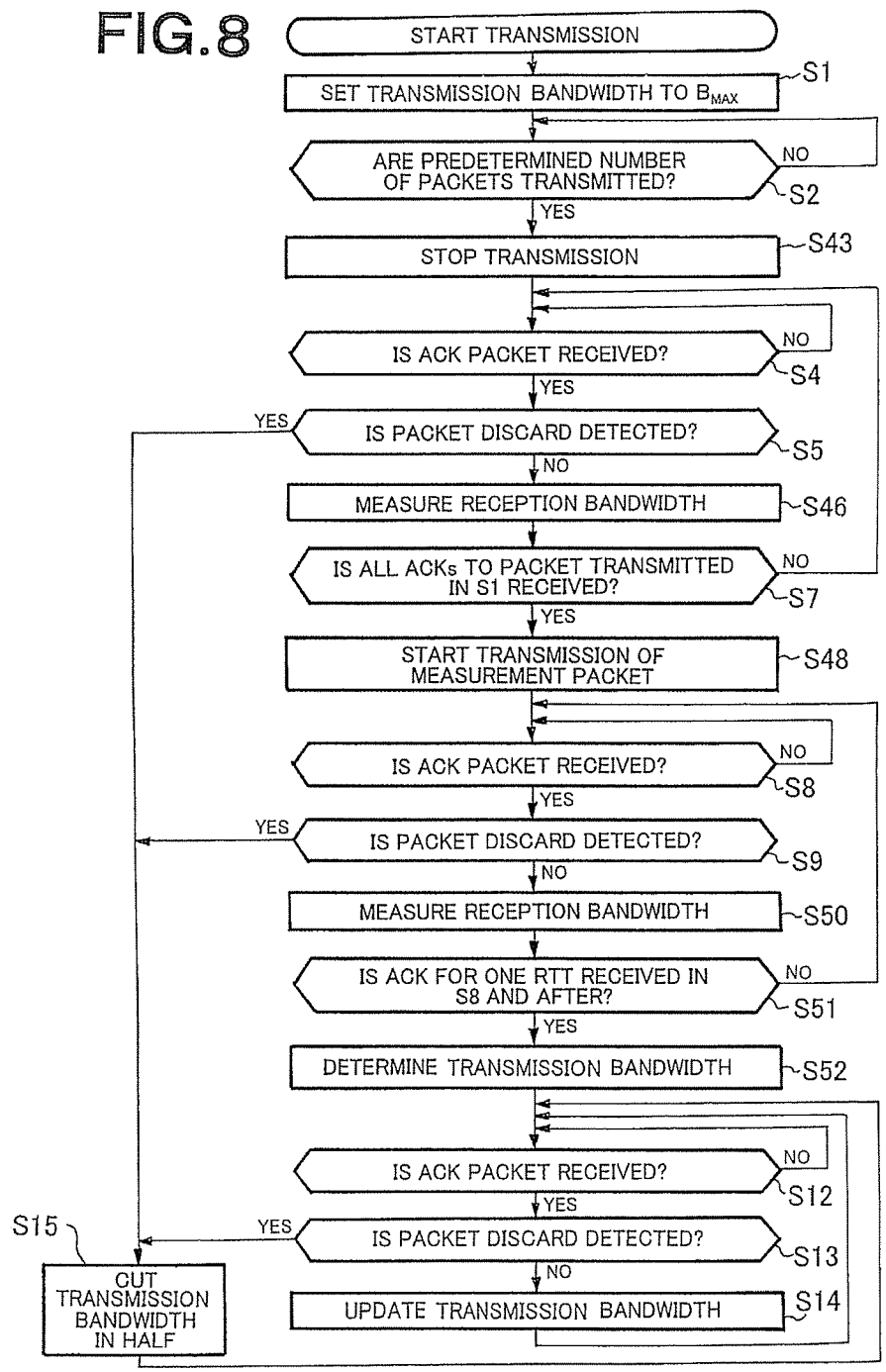
FIG. 8 is a flow chart showing an operation of the fifth exemplary embodiment of the present invention.

FIG. 8 is a flow chart for explaining an operation of the embodiment. In this case, the operation of the embodiment will be described below with reference to FIGS. 7 and 8.

When transmission data is generated in a data generating unit 1-1, according to the transmission bandwidth designated by the congestion control unit 5-4, a packet transmitting unit 1-2 packets the transmission data and transmits the packet. When an ACK packet to the transmitted packet arrives from the communication terminal of a communicatee, a packet receiving unit 1-3 notifies the packet transmitting unit 1-2, an optimum bandwidth estimating unit 1-7, and the optimum bandwidth measuring unit 5-10 of the arrival. In the RTT measuring unit 1-9, round-trip delay time (RTT) related to the packet and the minimum value (RTTmin) round-trip delay time from the start of transmission are measured.

In the congestion control unit 5-4, at the start of transmission, the initial transmission bandwidth control unit 1-6 controls a transmission bandwidth as will be described below. Immediately after transmission is started, a transmission bandwidth is set to $B_{MAX}$ (step S1). A typical value of $B_{MAX}$ is a line speed of a line to which a transmission terminal is connected. When a predetermined number of packets are completely output (step S2), transmission of the packets are temporarily stopped (step S43).

When arrival of an ACK packet is started (step S4), in the optimum bandwidth measuring unit 5-10, a reception speed to the received packets up to step S2 is measured as will be described below (step S46). However, at this time, if a packet loss is detected (step S5), a transmission bandwidth is cut in half of the reception bandwidth measured in step S46 (step S15), and the bandwidth control shifts to control of a stationary state (step S12 or later).

Reception bandwidth=amount of transmission data which can be confirmed to be received by ACK packet in step S1 and after/((time at which final ACK packet is received in step S1)−(time at which first ACK packet is received))  Equation (1)

When all ACK packets to the packets transmitted during step S1 is returned, packet output is continuously started by using the measured reception bandwidth as a transmission bandwidth (step S48). These packets are used as measurement packets to calculate an optimum bandwidth. In steps S8, S9, and S50, as in steps S4, S5, S46, a reception bandwidth is measured.

When an ACK for one RTT related to data output in step S48 or later is received (step S51), the measured received bandwidth is set as an initial value of transmission bandwidth, and the control operation shifts to processing of a stationary state in step S12 or later.

Transmission bandwidth control in the stationary state in step S12 or later is the same as that in the first embodiment. In the embodiment, an optimum bandwidth is measured twice at the start of transmission, the bandwidth can be measured correctly more than that in the first embodiment.

The first measurement is the same measurement as that in the first embodiment, and the measurement is performed by a small number of packets. For this reason, measurement accuracy is not very high. In the embodiment, by the measurement result, bandwidth measurement is performed again. In the second bandwidth measurement, since a transmission bandwidth in measurement is optimized by the measurement result obtained by the first measurement, even though measurement is performed in a period longer than that of the first measurement, a load on the network is small. Therefore, the second measurement can be performed for a long period of time, and the measurement can be correctly performed.

Sixth Exemplary Embodiment

A sixth exemplary embodiment of the present invention will be described below with reference to the accompanying drawings.

(Explanation of Configuration)

Figure 9:
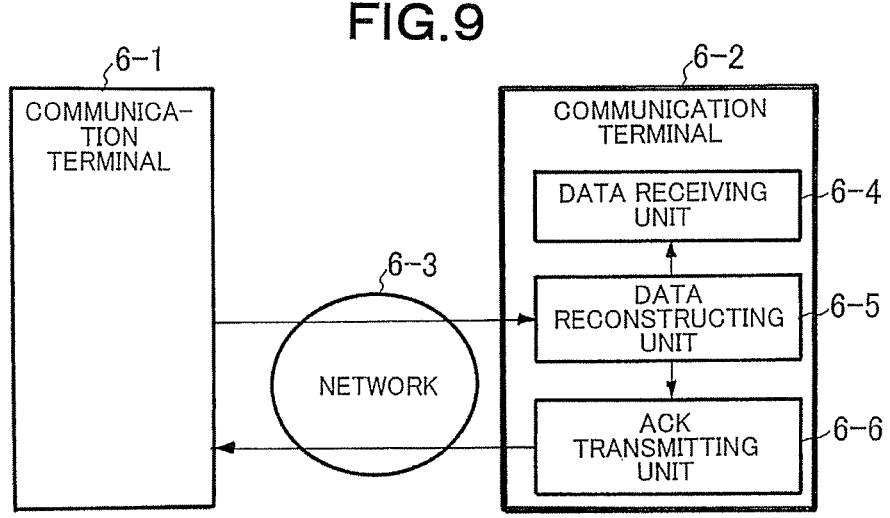
FIG. 9 is a block diagram showing a configuration of a system according to a sixth exemplary embodiment of the present invention.

FIG. 9 is a block diagram showing a configuration of a communication system according to the embodiment. This communication system is constituted by a communication terminal 6-1 serving as a transmission terminal, a communication terminal 6-2 serving as a reception terminal, and a network 6-3. Since a configuration of the communication terminal 6-1 is the same as that of the communication terminal 1 in the first embodiment, a description thereof will be omitted. Any one of the communication terminals described in the second to fifth embodiments can also be used. The communication terminal 6-2 is constituted by a data reconstructing unit 6-5 which reconstructs communication data from a received packet, a data receiving unit 6-4 which receives and processes the reconstructed data, and an ACK generating unit 6-6 which generates an ACK packet and returns the ACK packet to the communication terminal 6-1.

(Explanation of Operation)

An operation of the embodiment will be described below with reference to FIG. 9.

A packet transmitted from the transmission terminal 6-1 reaches the reception terminal 6-2 through a network 6-3.

The data reconstructing unit 6-5 extracts data from the received packet, reconstructs original data, and transmits the data to the data receiving unit 6-4. The data receiving unit 6-4 processes the received data by various reception applications.

The data reconstructing unit 6-5 notifies the ACK generating unit 6-6 of a number of received data. The ACK generating unit 6-6 generates an ACK packet on the basis of the number and transmits the ACK packet to the communication terminal 6-1. The number of the data communicated by the ACK packet is a number of data which is confirmed to be received by the communication terminal 6-2. The number and data having numbers before the number are reliably received by the communication terminal 6-2. Therefore, when the communication terminal 6-1 receives the ACK packet, data having numbers up to the number written in the packet are not retransmitted. For this reason, these data may be discarded on the communication terminal 6-1 side. When packet discard occurs on a transmission path, the communication terminal 6-2 writes the number of the same data in a plurality of ACKs to notify the communication terminal 6-1 that data having numbers subsequent to the number is not received and to urge the communication terminal 6-1 to perform retransmission. As another method, a NACK (Negative ACK) which explicitly shows the occurrence of packet discard may be transmitted from the communication terminal 6-2 side to the communication terminal 6-1 side.

Figure 10:
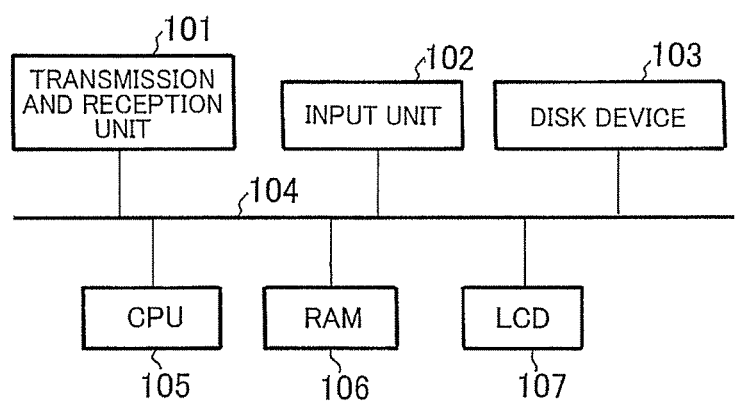
FIG. 10 is a block diagram showing an example of a configuration of a computer.

The communication terminals according to the embodiments described above may be constituted by hardware using dedicated ICs and the like. However, the communication terminals may be realized by software using a computer. More specifically, for example, any one of the communication terminals shown in FIGS. 1, 4, 5, and 7 is constituted by a computer as shown in FIG. 10, and functions of the communication terminals can be realized by programs in which any one of flows shown in FIGS. 2, 3, 6, and 8 or operations of the embodiments are written. Such program is stored in a disk device 103 such as a hard disk device or a storage device (in this case, a disk device) such as a ROM (Read On Memory), and a program which realizes the functions of the communication terminal is executed by a CPU 105. An input unit 102 is an input device such as a keyboard. A transmitting/receiving unit 101 corresponds to a packet transmitting unit and a packet receiving unit. An LCD (liquid crystal device) 107 displays an information processing state or a determination result. Reference numeral 104 denotes a bus such as a data bus. Reference numeral 106 denotes a memory such as a DRAM which stores information required for information processing in the CPU 105.

The data required for the execution process is stored in a random access memory (RAM) such as the DRAM. The hard disk device or the storage device such as the ROM serves as a computer readable medium containing the program (program product) which realizes the functions of the communication terminal. A computer readable medium may be a CDROM, a semiconductor memory such as a flash memory, or a DVD which the program is storage.

Although the exemplary embodiments of the present invention have been described in detail, it should be understood that various changes, substitutions and alternatives can be made therein without departing from the spirit and scope of the invention as defined by the appended claims. Further, it is the inventor's intent to retain all equivalents of the claimed invention even if the claims are amended during prosecution.

The present invention relates to a communication terminal, a communication system, a congestion control method, and a congestion control program. In particular, the present invention can be applied to a communication terminal, a communication system, a congestion control method, and a congestion control program which realize low-delay communication even in a high-speed line.

What is claimed is:

1. A communication terminal used in a communication system which performs data transmission and reception between a plurality of communication terminals through a network, comprising:
a first transmission bandwidth control unit which performs transmission bandwidth control independently of a state of the network;
a second transmission bandwidth control unit which performs transmission bandwidth control depending on a state of the network; and
a bandwidth measuring unit which measures the transmission bandwidth when bandwidth control is shifted to bandwidth control by the second transmission bandwidth control unit,
wherein
when transmission is started, bandwidth control by the first transmission bandwidth control unit is performed and a certain number of packets are transmitted,
a data amount of the certain number of packets which reception is confirmed by an acknowledgement packet to the certain number of packets is divided by a time required for the reception of the acknowledgement packet and a packet which value obtained by the division is set as a transmission bandwidth is transmitted, and
a transmission bandwidth is measured by using the transmitted packet as a measurement packet for calculating an optimum bandwidth and bandwidth control by the second transmission bandwidth control unit is performed by the measured transmission bandwidth.

2. A communication terminal used in a communication system which performs data transmission and reception between a plurality of communication terminals through a network, comprising:
a first transmission bandwidth control unit which performs transmission bandwidth control independently of a state of the network;
a second transmission bandwidth control unit which performs transmission bandwidth control depending on a state of the network; and
a bandwidth estimating unit which determines the transmission bandwidth when bandwidth control is shifted to bandwidth control by the second transmission bandwidth control unit,
wherein
the first transmission bandwidth control unit designates a predetermined first transmission bandwidth when transmission is started, and thereafter, after a predetermined amount of data is outputted or after data is outputted for a predetermined period of time, the first transmission bandwidth control unit designates a predetermined second transmission bandwidth,
a data amount which reception is confirmed by a first acknowledgement packet to data of the first transmission bandwidth is divided by a time required for the reception of the first acknowledgement packet and value obtained by the division is calculated as a third transmission bandwidth,
a remainder when a minimum round-trip delay time (RTT) is subtracted from the sum of a first maximum RTT and a second maximum RTT is calculated, the first maximum RTT being a time measured for reception of all acknowledgement packets to data of the first transmission bandwidth, the second maximum RTT being a time measured for reception of all acknowledgement packets to data of the second transmission bandwidth,
a third transmission bandwidth is adjusted by a ratio of the remainder to the minimum RTT, and
the bandwidth control by the second transmission bandwidth control unit is performed based on the adjusted third transmission bandwidth.

3. A communication terminal used in a communication system which performs data transmission and reception between a plurality of communication terminals through a network, comprising:
a first transmission bandwidth control unit which performs transmission bandwidth control independently of a state of the network;
a second transmission bandwidth control unit which performs transmission bandwidth control depending on a state of the network; and
a bandwidth estimating unit which determines the transmission bandwidth when bandwidth control is shifted to bandwidth control by the second transmission bandwidth control unit,
wherein
the first transmission bandwidth control unit designates a predetermined first transmission bandwidth when transmission is started, and, thereafter, the first transmission bandwidth control unit reduces the first transmission bandwidth,
a data amount which reception is confirmed by an acknowledgement packet to data of the first transmission bandwidth is divided by a time required for the reception of the acknowledgement packet and value obtained by the division is calculated as a second transmission bandwidth, and
the bandwidth control by the second transmission bandwidth control unit is performed based on the second transmission bandwidth calculated when all acknowledgement packets are received.

4. The communication terminal according to claim 2, wherein the first transmission bandwidth is determined by a line speed of a line to which the communication terminal is connected, a maximum transmission bandwidth in a past communication, a bandwidth of an internal bus of the communication terminal, or a maximum communication speed assumed by a communication application.

5. The communication terminal according to claim 3, wherein the first transmission bandwidth is determined by a line speed of a line to which the communication terminal is connected, a maximum transmission bandwidth in a past communication, a bandwidth of an internal bus of the communication terminal, or a maximum communication speed assumed by a communication application.

6. The communication terminal according to claim 2, wherein the second transmission bandwidth is determined by a bandwidth obtained by dividing a link bandwidth by the assumed number of communication session, a minimum transmission bandwidth in a past communication, or a minimum communication speed assumed by a communication application.

7. The communication terminal according to claim 2, wherein at a restart of the data transmission after a temporary stop of data transmission, when a stop period of time is shorter than a predetermined period of time, the bandwidth control by the second transmission bandwidth control unit is continued, and, when the stop period of time is not shorter than the predetermined period of time, the bandwidth control returns to the bandwidth control by the first transmission bandwidth control unit.

8. The communication terminal according to claim 3, wherein at a restart of the data transmission after a temporary stop of data transmission, when a stop period of time is shorter than a predetermined period of time, the bandwidth control by the second transmission bandwidth control unit is continued, and, when the stop period of time is not shorter than the predetermined period of time, the bandwidth control returns to the bandwidth control by the first transmission bandwidth control unit.

9. The communication terminal according to claim 3, wherein at a restart of data transmission after a stop of the data transmission, the first transmission bandwidth is set by using a stop period of time of the data transmission and a transmission bandwidth used before the stop of the data transmission.

10. The communication terminal according to claim 9, wherein when a transmission stop period of time is shorter than a predetermined period of time, the first transmission bandwidth is set on the basis of the transmission bandwidth obtained before the data transmission is stopped, and when the transmission stop period of time is not shorter than the predetermined period of time, the first transmission bandwidth is set on the basis of the line speed.

11. The communication terminal according to claim 3, wherein at a restart of the data transmission after a temporary stop of data transmission, the transmission bandwidth before the stop is used after the data transmission and thereafter, the transmission bandwidth at a restart of the data transmission is set by using a function which approaches a line speed in an exponential fashion about a stop time.

12. A congestion control method for a communication terminal used in a communication system which performs data transmission and reception between a plurality of communication terminals through a network, the communication terminal including a first transmission bandwidth control unit which performs transmission bandwidth control independently of a state of the network, a second transmission bandwidth control unit which performs transmission bandwidth control depending on a state of the network, and a bandwidth measuring unit which measures the transmission bandwidth when bandwidth control is shifted to bandwidth control by the second transmission bandwidth control unit, the method comprising:
performing, by the first transmission bandwidth control unit, transmission bandwidth control independently of a state of the network when transmission is started, and transmitting a certain number of packets;
dividing a data amount of the certain number of packets which reception is confirmed by an acknowledgement packet to the certain number of packets, by a time required for the reception of the acknowledgement packet, and transmitting a packet which value obtained by the division is set as a transmission bandwidth; and
measuring a transmission bandwidth by using the transmitted packet as a measurement packet for calculating an optimum bandwidth, and performing, by the second transmission bandwidth control unit, transmission bandwidth control depending on the state of the network by the measured transmission bandwidth.

13. A congestion control method for a communication terminal used in a communication system which performs data transmission and reception between a plurality of communication terminals through a network, the communication terminal including a first transmission bandwidth control unit which performs transmission bandwidth control independently of a state of the network, a second transmission bandwidth control unit which performs transmission bandwidth control depending on a state of the network, and a bandwidth measuring unit which measures the transmission bandwidth when bandwidth control is shifted to bandwidth control by the second transmission bandwidth control unit, the method comprising:
outputting a predetermined amount of data or outputting data for a predetermined period of time by a predetermined first transmission bandwidth designated by the first transmission bandwidth control unit when transmission is started, and thereafter, changing the predetermined first transmission bandwidth to a predetermined second transmission bandwidth designated by the first transmission bandwidth control unit;
dividing a data amount which reception is confirmed by a first acknowledgement packet to data of the first transmission bandwidth, by a time required for the reception of the first acknowledgement packet, and calculating value obtained by the division as a third transmission bandwidth;
calculating a remainder when a minimum round-trip delay time (RTT) is subtracted from the sum of a first maximum RTT and a second maximum RTT, the first maximum RTT being a time measured for reception of all acknowledgement packets to data of the first transmission bandwidth, the second maximum RTT being a time measured for reception of all acknowledgement packets to data of the second transmission bandwidth;
adjusting a third transmission bandwidth by a ratio of the remainder to the minimum RTT; and
performing, by the second transmission bandwidth control unit, the bandwidth control depending on the state of the network based on the adjusted third transmission bandwidth.

14. A congestion control method for a communication terminal used in a communication system which performs data transmission and reception between a plurality of communication terminals through a network, the communication terminal including a first transmission bandwidth control unit which performs transmission bandwidth control independently of a state of the network, a second transmission bandwidth control unit which performs transmission bandwidth control depending on a state of the network, and a bandwidth measuring unit which measures the transmission bandwidth when bandwidth control is shifted to bandwidth control by the second transmission bandwidth control unit, the method comprising:

designing, by the first transmission bandwidth control unit, a predetermined first transmission bandwidth when transmission is started, and, thereafter, reducing, by the first transmission bandwidth control unit, the first transmission bandwidth;

dividing a data amount which reception is confirmed by an acknowledgement packet to data of the first transmission bandwidth, by a time required for the reception of the acknowledgement packet, and calculating value obtained by the division as a second transmission bandwidth; and performing, by the second transmission bandwidth control unit, the bandwidth control depending on the state of the network based on the second transmission bandwidth calculated when all acknowledgement packets are received.

15. A non-transitory computer-readable recording medium with a computer program to cause a computer serving as a communication terminal of a communication system which performs data transmission and reception between a plurality of communication terminals through a network to execute functions and steps, the functions comprising:

a first transmission bandwidth control function which performs transmission bandwidth control independently of a state of the network;

a second transmission bandwidth control function which performs transmission bandwidth control depending on a state of the network; and a bandwidth measuring function which measures the transmission bandwidth when bandwidth control is shifted to bandwidth control by the second transmission bandwidth control function, the steps comprising:

performing, by the first transmission bandwidth control function, transmission bandwidth control independently of a state of the network when transmission is started, and transmitting a certain number of packets;

dividing a data amount of the certain number of packets which reception is confirmed by an acknowledgement packet to the certain number of packets, by a time required for the reception of the acknowledgement packet, and transmitting a packet which value obtained by the division is set as a transmission bandwidth; and measuring a transmission bandwidth by using the transmitted packet as a measurement packet for calculating an optimum bandwidth, and performing, by the second transmission bandwidth control function, transmission bandwidth control depending on the state of the network by the measured transmission bandwidth.

16. A non-transitory computer-readable recording medium with a computer program to cause a computer serving as a communication terminal of a communication system which performs data transmission and reception between a plurality of communication terminals through a network to execute functions and steps, the functions comprising:

a first transmission bandwidth control function which performs transmission bandwidth control independently of a state of the network;

a second transmission bandwidth control function which performs transmission bandwidth control depending on a state of the network; and a bandwidth measuring function which measures the transmission bandwidth when bandwidth control is shifted to bandwidth control by the second transmission bandwidth control function, the steps comprising:

outputting a predetermined amount of data or outputting data for a predetermined period of time by a predetermined first transmission bandwidth designated by the first transmission bandwidth control function when transmission is started, and thereafter, changing the predetermined first transmission bandwidth to a predetermined second transmission bandwidth designated by the first transmission bandwidth control function;

dividing a data amount which reception is confirmed by a first acknowledgement packet to data of the first transmission bandwidth, by a time required for the reception of the first acknowledgement packet, and calculating value obtained by the division as a third transmission bandwidth;

calculating a remainder when a minimum round-trip delay time (RTT) is subtracted from the sum of a first maximum RTT and a second maximum RTT, the first maximum RTT being a time measured for reception of all acknowledgement packets to data of the first transmission bandwidth, the second maximum RTT being a time measured for reception of all acknowledgement packets to data of the second transmission bandwidth;

adjusting a third transmission bandwidth by a ratio of the remainder to the minimum RTT; and performing, by the second transmission bandwidth control function, the bandwidth control depending on the state of the network based on the adjusted third transmission bandwidth.

17. A non-transitory computer-readable recording medium with a computer program to cause a computer serving as a communication terminal of a communication system which performs data transmission and reception between a plurality of communication terminals through a network to execute functions and steps, the functions comprising:

a first transmission bandwidth control function which performs transmission bandwidth control independently of a state of the network;

a second transmission bandwidth control function which performs transmission bandwidth control depending on a state of the network; and a bandwidth measuring function which measures the transmission bandwidth when bandwidth control is shifted to bandwidth control by the second transmission bandwidth control function, the step comprising:

designing, by the first transmission bandwidth control function, a predetermined first transmission bandwidth when transmission is started, and, thereafter, reducing, by the first transmission bandwidth control function, the first transmission bandwidth;

dividing a data amount which reception is confirmed by an acknowledgement packet to data of the first transmission bandwidth, by a time required for the reception of the acknowledgement packet, and calculating value obtained by the division as a second transmission bandwidth; and performing, by the second transmission bandwidth control function, the bandwidth control depending on the state of the network based on the second transmission bandwidth calculated when all acknowledgement packets are received.

* * * * *